Jan. 10, 1967    M. FUENTES    3,296,799
THRUST VECTOR CONTROL SYSTEM
Filed Aug. 27, 1965
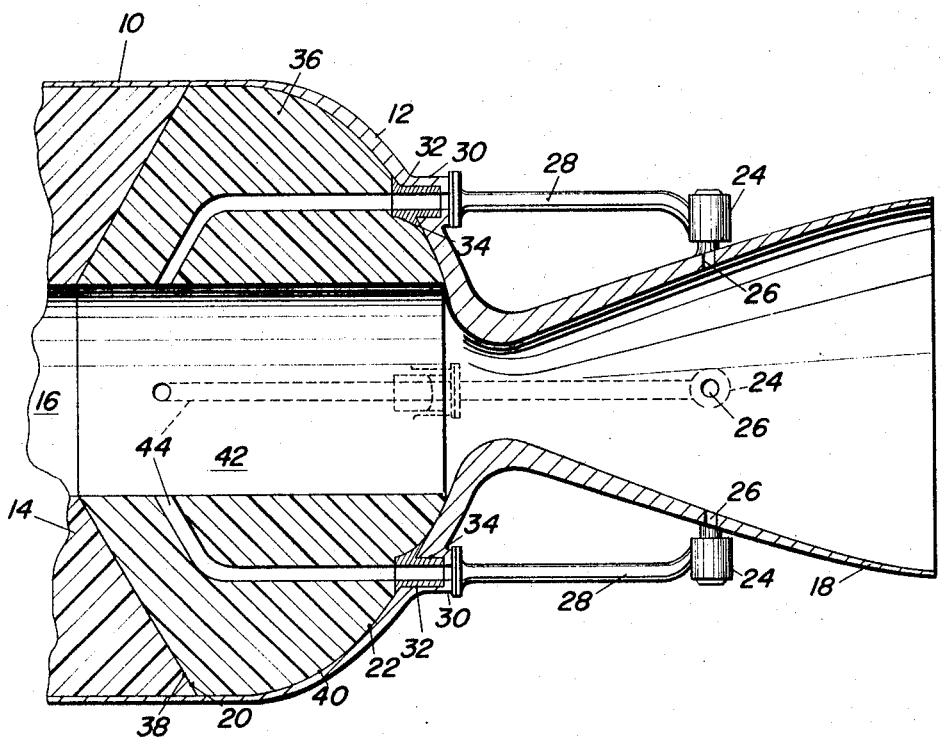
INVENTOR.
MANUEL FUENTES
BY Edwin D. Grant
ATTORNEY

3,296,799
THRUST VECTOR CONTROL SYSTEM
Manuel Fuentes, Brigham City, Utah, assignor to Thiokol Chemical Corporation, Bristol, Pa., a corporation of Delaware
Filed Aug. 27, 1965, Ser. No. 483,158
2 Claims. (Cl. 60—231)

This invention relates to a rocket motor and more particularly to a thrust vector control system for a solid propellant rocket motor.

One method of controlling the thrust vector of a rocket motor is to bleed off gas from its combustion chamber and to inject this gas into the thrust nozzle of the rocket motor in a direction transverse to the longitudinal axis thereof. Although such a system of thrust vector control has certain advantages, its use in connection with a solid propellant rocket motor has presented difficulties which result from the fact that combustion products of certain high-performance solid propellants contain solids, such as aluminum oxide, that have a tendency to coat, or in some instances to erode, surfaces which they contact. Consequently, valves used in prior art arrangements to meter the flow of thrust vector control gas of a solid propellant rocket motor become plugged or are otherwise rendered inoperative in an extremely short time. The present invention not only solves the problem of supplying a solid-free gas for thrust vector control of a solid propellant rocket motor but also accomplishes this desirable result without adding unusable weight to the rocket motor.

Accordingly, it is a broad object of this invention to provide an improved thrust vector control system for a solid propellant rocket motor.

Another object of this invention is to provide a rocket motor thrust vector control system which obviates the disadvantages, such as the fouling of valves and ducts, associated with conventional thrust vector control systems wherein solid propellant combustion products are injected into a rocket motor thrust nozzle to control the thrust vector thereof.

These and other objects of the invention will be readily understood by reading the following description of a preferred embodiment of the invention, in which reference is made to the accompanying drawing which illustrates, in fragmentary longitudinal sectional view, the aft end of a rocket motor incorporating the embodiment.

In the drawing there is illustrated a rocket motor comprising a casing 10 with an aft end closure 12 integrally joined thereto. The rocket motor is provided with a solid propellant grain 14 comprising material, such as powdered aluminum, which may be suspended in solid form in the gaseous combustion products of said grain when the rocket motor is fired. A perforation 16 extends longitudinally of grain 14, the longitudinal axis of this perforation being substantially coincident with the longitudinal axis of a thrust nozzle 18 mounted on aft end closure 12. The aft end surface 20 of grain 14 is spaced from the inner surface 22 of aft end closure 12.

Four valves 24 (one of which is not shown and one of which is represented in the drawing by broken lines) are mounted on thrust nozzle 18 and spaced circumferentially thereof. More particularly, the angular spacing between adjacent pairs of the valves is 90 degrees, and the valves are equidistant from the end of the thrust nozzle. Although for the sake of simplicity, only the exterior of the valves 24 is illustrated in the drawing, a passage extends through each valve and communicates with the interior of thrust nozzle 18 through an aperture 26 (one of which is not shown) formed in the wall thereof. Each valve also includes conventional means, such as a plug movable relative to an orifice, for opening and closing the passage therein. A duct 28 (one of which is not shown) is connected at one end thereof to each valve 24 and at the other end thereof to one of four bosses 30 (one of which is not shown and one of which is represented in the drawing by broken lines) which are integrally formed on aft end closure 12 and spaced circumferentially thereof so that each boss is longitudinally aligned with a respective one of the valves 24. The passage in each duct 28 communicates with the passage in the valve 24 with which the duct is connected, and also with the interior of casing 10 through an aperture 32 (one of which is not shown and one of which is represented in the drawing by broken lines) formed in each boss 30. An annular heat resistant insert 34 is positioned in each aperture 32.

A solid propellant insert 36 is disposed within the aft portion of casing 10, the forward surface 38 of said insert abutting the aft end surface of grain 14 and the aft surface 40 of said insert abutting the inner surface 22 of aft end closure 12 and the inwardly-extending surfaces of inserts 34. A perforation 42 extends between the forward and aft ends of insert 36 and communicates with perforation 16 of grain 14 and with the orifice of thrust nozzle 18. Insert 36 is provided with four passages 44 (one of which is not shown and one of which is represented in the drawing by broken lines) each of which extends between the inner surface 46 and aft surface 40 thereof and communicates with the passage in a respective one of the ducts 28 (through the apertures 32 in bosses 30 of aft end closure 12) and with the perforation 42 in said insert.

Insert 36 is formed of a solid propellant that generates a solid-free gas when burned, such as 19% by weight polybutadiene acrylic acid plus epoxide curing agent $C_{19}H_{23}O_4$) and 81% by weight ammonium perchlorate. It is to be clearly understood, however, that the invention is not limited to the use of this particular propellant for insert 36, since there are many other propellant compositions that produce solid-free combustion products. Insert 36 is preferably bonded to the aft surface 20 of grain 14 and to the inner surface of casing 10 (which includes the inner surface of the aft end closure 12 portion of said casing) by means of one of the numerous bonding materials which are well-known to those skilled in the art of solid propellant rockets. Valves 24 and ducts 28 may be formed of any suitable heat-resistant metal alloy, and inserts 34 are preferably formed of graphite or similar material.

When grain 14 is ignited, burning occurs at the surface of the perforation 16 thereof and also at the surfaces of the perforation 42 and passages 44 of insert 36. The gas generated by combustion of insert 36 flows through the passages in ducts 28 to valves 24, and when the thrust vector of the rocket motor is to be varied, these valves are selectively actuated to allow the gas to discharge through apertures 24 into the interior of thrust nozzle 18. Since the gas generated by combustion of insert 36 is free of solid particles and since the pressure of this gas in the passages 44 prevents the combustion products of grain 14 from entering ducts 28, the valves can be opened and closed as desired throughout the firing period of the rocket motor without any possibility of their passage and slidably engaged components being fouled. Furthermore, when any one of the valves 24 is closed, gas generated in the passage 44 associated therewith flows through thrust nozzle 18 and thus adds to the thrust of the rocket motor. Hence, it will be appreciated that the described embodiment of the invention eliminates the aforementioned problems encountered in the use of prior art thrust vector control systems.

While only one form which the present invention may take has been described and illustrated, it will be apparent that various modifications can be made in the disclosed thrust vector control system without departing in any way

What is claimed is:

1. In a rocket motor having a casing with an aft end closure, a thrust nozzle mounted on said aft end closure, a solid propellant grain disposed within said casing with the aft end surface thereof spaced from said aft end closure, and a perforation extending longitudinally of said grain, a thrust vector control system comprising:

at least one valve mounted on said thrust nozzle, said valve having a passage therethrough that communicates with the interior of said thrust nozzle through an aperture in the wall thereof and including means for selectively opening and closing said passage;

a duct connected at one end thereof to said valve and at the other end thereof to said aft end closure, the passage of said duct communicating with said passage in said valve and with the interior of said casing through an aperture in the wall of said aft end closure thereof; and a solid propellant insert disposed within said casing, the forward and aft surfaces of said insert abutting the aft end surface of said grain and the inner surface of said aft end closure respectively, said insert having a perforation therein that extends between the forward and aft ends thereof and communicates with said perforation in said grain and with the orifice of said thrust nozzle, said insert forming a solid-free gas when burned and having a passage therein that extends between the inner and aft surfaces thereof and communicates with said passage in said duct and with said perforation.

2. In a rocket motor having a casing with an aft end closure, a thrust nozzle mounted on said aft end closure, a solid propellant grain disposed within said casing with the aft end surface thereof spaced from said aft end closure, and a perforation extending longitudinally of said grain, a thrust vector control system comprising:

a plurality of valves mounted on said thrust nozzle and spaced circumferentially thereof, each of said valves having a passage therethrough that communicates with the interior of said thrust nozzle through an aperture in the wall thereof and including means for selectively opening and closing said passage;

a plurality of ducts each connected at one end thereof to a respective one of said valves and at the other end thereof to said aft end closure, the passage in each of said ducts communicating with the passage in the valve to which it is connected and with the interior of said casing through an aperture in the wall of said aft end closure thereof; and a solid propellant insert disposed within said casing, the forward and aft surfaces of said insert abutting the aft end surface of said grain and the inner surface of said aft end closure respectively, said insert having a perforation therein that extends between said forward and aft ends thereof and communicates with said perforation in said grain and with the orifice of said thrust nozzle, said insert forming a solid-free gas when burned and having a plurality of passages therein each of which extends between the inner and aft surfaces thereof and communicates with the passage in a respective one of said ducts and with said perforation.

References Cited by the Examiner
UNITED STATES PATENTS

| | | | |
|---|---|---|---|
| 3,029,602 | 4/1962 | Allen | 60—35.6 X |
| 3,092,963 | 6/1963 | Lawrence | 60—35.6 X |
| 3,134,225 | 5/1964 | Pennington | 60—35.54 |
| 3,147,590 | 9/1964 | Thielman | 60—35.54 |
| 3,166,897 | 1/1965 | Lawrence et al. | 60—35.54 |
| 3,197,959 | 8/1965 | Keller | 60—35.6 X |

MARK NEWMAN, *Primary Examiner.*

A. L. SMITH, *Assistant Examiner.*